(12) United States Patent
Ray et al.

(10) Patent No.: US 9,336,249 B2
(45) Date of Patent: May 10, 2016

(54) DECISION TREE WITH JUST-IN-TIME NODAL COMPUTATIONS

(71) Applicant: Wal-Mart Stores, Inc., Bentonville, AR (US)

(72) Inventors: Andrew Benjamin Ray, Bentonville, AR (US); Nathaniel Philip Troutman, Seattle, WA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 411 days.

(21) Appl. No.: 13/874,281

(22) Filed: Apr. 30, 2013

(65) Prior Publication Data

US 2014/0324897 A1  Oct. 30, 2014

(51) Int. Cl.
*G06F 17/30* (2006.01)
(52) U.S. Cl.
CPC ............... *G06F 17/30303* (2013.01)
(58) Field of Classification Search
None
See application file for complete search history.

(56) References Cited

U.S. PATENT DOCUMENTS

| 5,787,274 | A | 7/1998 | Agrawal |
| 5,909,681 | A * | 6/1999 | Passera et al. ................ 1/1 |
| 6,138,115 | A | 10/2000 | Agrawal |
| 6,718,315 | B1 | 4/2004 | Meek |
| 7,089,226 | B1 | 8/2006 | Dumais |
| 2012/0278263 | A1* | 11/2012 | Borthwick et al. ............. 706/12 |
| 2014/0188839 | A1* | 7/2014 | Nielsen et al. ................ 707/711 |
| 2014/0258293 | A1* | 9/2014 | Wong et al. ................... 707/737 |

* cited by examiner

*Primary Examiner* — Jay Morrison
(74) *Attorney, Agent, or Firm* — Bryan Cave LLP

(57) ABSTRACT

A computer-implemented method is disclosed for efficiently processing a large number of records. In the method, a computer system may obtain a plurality of records and a decision tree. The decision tree may include a distinction node corresponding to a distinction requiring completion of a computation. Due to the fact that the computation may be, in the overall context of the process, computationally expensive, it may initially be left uncomputed. Accordingly, if the distinction node is never reached when records are being processed, no computation time gets wasted. However, if and when the distinction node is reached, the computer system may complete the computation and make the distinction based on results of the computation.

23 Claims, 6 Drawing Sheets

DECISION TREE WITH JUST-IN-TIME NODAL COMPUTATIONS

BACKGROUND

1. Field of the Invention

This invention relates to computerized record processing systems and more particularly to systems and methods for efficiently processing a collection of records through one or more decision trees.

2. Background of the Invention

The computation time required for certain types of record processing increases rapidly as the number of records increases. For example, record linkage requires comparing pairs of records. Each such comparison is computationally expensive. Additionally, as the number records increases, the number of comparisons that need to be conducted grows exponentially. Accordingly, what is needed is a computer system configured to efficiently process large numbers of records.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
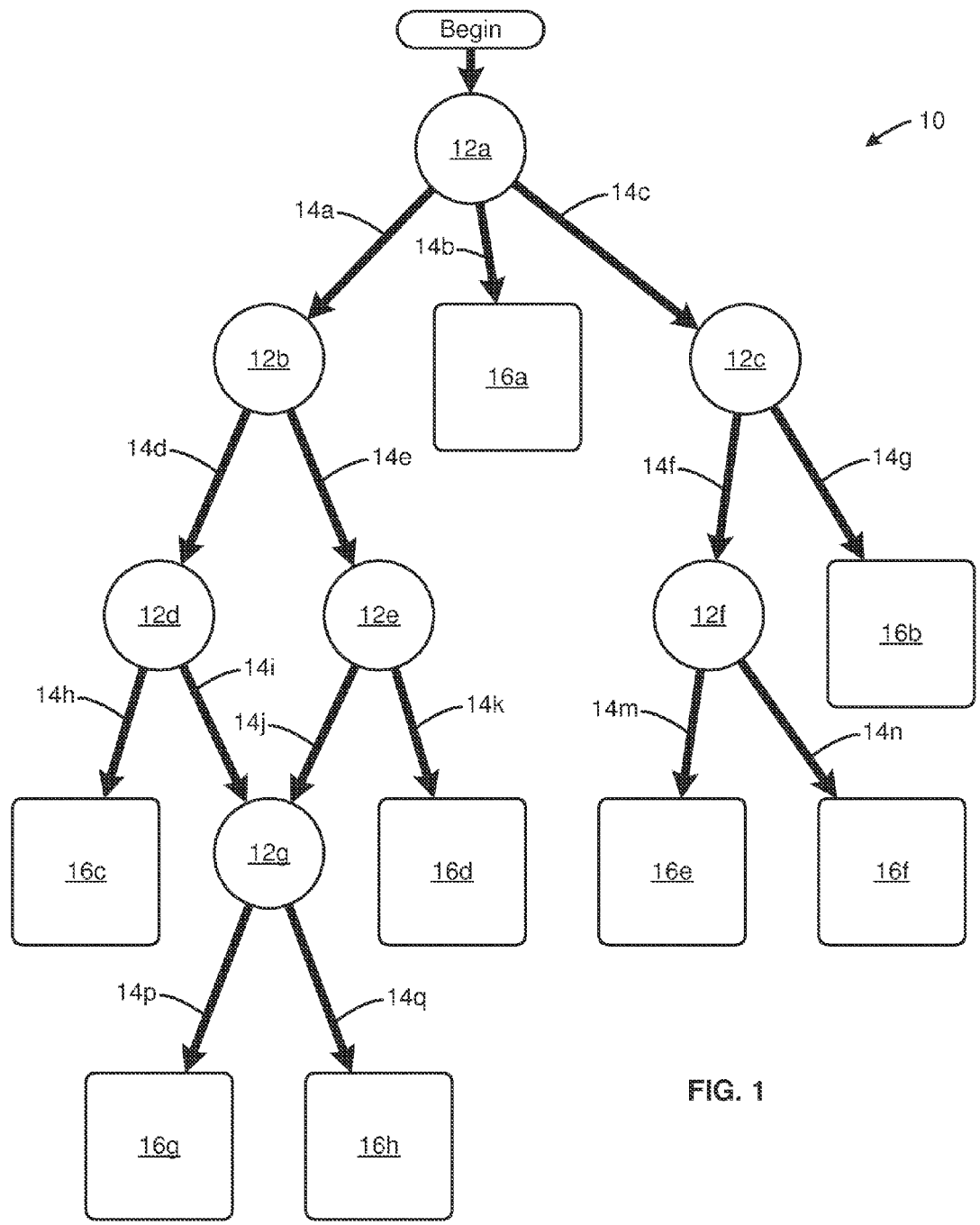
FIG. 1 is a schematic block diagram of one embodiment of a decision tree in accordance with the present invention.

Referring to FIG. 1, record linkage may include determining if two or more records are the same, correspond or refer to the same entity, or the like. When such records are identified, record linkage may further include linking those records together in some manner.

For example, in selected embodiments, a collection of computer records may correspond to a plurality of customers (e.g., each record may comprise a customer profile). Accordingly, a computer system in accordance with the present invention may seek to link together all records within the collection that correspond to the same customer or household. In certain embodiments, a system may accomplish this by comparing various attributes of the records (e.g., customer names, addresses, telephone numbers, email addresses, or the like) using one or more decision trees 10 (e.g., a random forest of probability estimation trees 10).

A decision tree 10 in accordance with the present invention may have any suitable form, composition, or output. In selected embodiments, a decision tree 10 may comprise a probability estimation tree. Rather than generating a simple class membership, a probability estimation tree may yield an estimate of the probability that subject data (e.g., the data being processed through a decision tree 10) is in one or more classes. A random forest may comprise a combination of probability estimation trees, where each tree is grown on a subset of the distinctions and then all the estimates of the trees are combined to return a single class membership Probability Distribution Function (PDF) for the forest. In selected embodiments in accordance with the present invention, the subject data may comprise pairs of records that are being compared for the purpose of record linkage.

A decision tree 10 in accordance with the present invention may comprise multiple distinction or decision nodes 12. Each distinction node 12 may correspond to a distinction that may be applied by a computer system to all subject data passing therethrough. Although only seven distinction nodes 12a-12g are illustrated, a decision tree 10 may include any number of distinction nodes 12.

In operation, a computer system may commence analysis of subject data at a first distinction node 12a. Paths 14 or branches 14 may extend from the first distinction node 12a to other nodes 12b, 12c. Additional paths 14 may in turn extend to yet more distinction nodes 12. It should be noted that, although distinction nodes 12 with two and three paths 14 extending therefrom are illustrated, a distinction node 12 in accordance with the present invention may include any suitable number of paths 14 extending therefrom.

Typically, a distinction node 12 may have only one path 14 extending thereto. For example, only one path 14a, 14c leads to each of the distinction nodes 12b, 12c that immediately follow the first distinction node 12a. However, in selected embodiments, a decision tree 10 may include multiple paths 14 that converge on a particular distinction node 12 (e.g., paths 14i and 14j converge on distinction node 12g). Such a node 12 may be referred to as a "sink node."

Based on the subject data as applied to a distinction (or based on the distinction as applied to the subject data), a computer system may select a particular path 14 from among the multiple paths 14 extending from a corresponding distinction node 12. The subject data may then be directed to (e.g., "arrive" at, "reach") another distinction node 14. In this manner, the subject data may proceed through a decision tree 10. At each distinction node 12, a computer system may learn something new about the subject data.

Eventually, subject data proceeding through a decision tree 10 may be directed to a terminal point. Such terminal points may be referred to as leaf nodes 16. A leaf node 16 may provide or correspond to information that may be used by a computer system to characterize the subject data. For example, based on the particular leaf node 16 reached and/or the particular distinction nodes 12 and paths 14 used to get there, a computer system may be able to generate a PDF for the subject data.

In selected embodiments, a PDF may identify the probabilities corresponding to various characterizations of the subject data. For example, in a record linkage embodiment, the subject data may comprise two records that are being compared to determine whether they correspond to the same person, household, or the like. Accordingly, a PDF may identify (e.g., expressly or inherently) two probabilities. One such probability may characterize the likelihood that the records correspond to the same person, household, or the like. The other such probability may characterize the likelihood that the records do not correspond to the same person, household, or the like.

Figure 2:
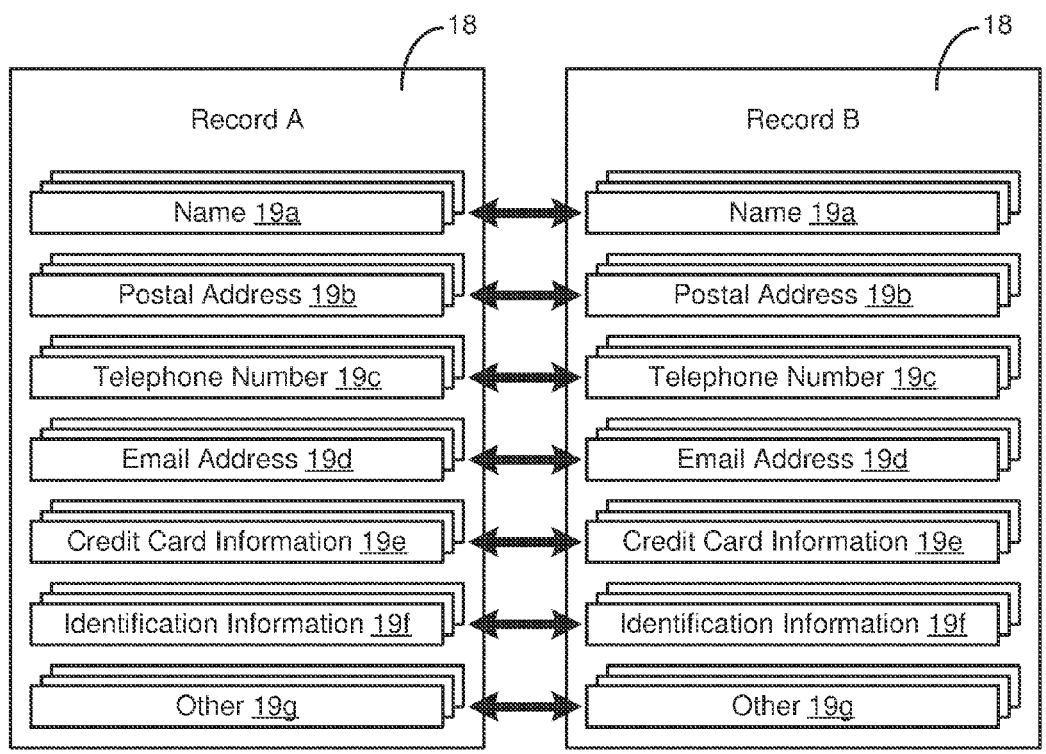
FIG. 2 is a schematic block diagram showing a comparison of two computerized records in accordance with the present invention.

Referring to FIG. 2, computerized records 18 processed in accordance with the present invention may have any suitable form or content. In selected embodiments, records 18 may correspond to the activities of a business, information related to a business, activities of customers of one or more businesses, information related to customers of one or more businesses, or the like or a combination or sub-combination thereof. For example, as noted hereinabove, records 18 may correspond to or comprise customer profiles.

A computerized record 18 may include or contain one or more fields 19, members 19, attributes 19, or the like. The nature of the attributes 19 may correspond to the nature or purpose of a record 18. For example, a record 18 that is embodied as a customer profile may include one or more attributes 19 corresponding to contact information, demographic information, geographic information, and psychographic characteristics, buying patterns, credit-worthiness, purchase history, or the like or a combination or sub-combination thereof. Accordingly, in selected embodiments, a record 18 may include or contain attributes 19 of one or more names 19a, postal addresses 19b, telephone numbers 19c, email addresses 19d, credit card information 12e (e.g., codes or index information corresponding to credit card data), identification information 19f (e.g., account numbers, customer numbers, membership numbers, or the like), other information 19g as desired or necessary, or the like.

Records 18 in accordance with the present invention may be processed in any suitable manner. As noted hereinabove, in selected embodiments, it may be desirable to identify one or more links between two or more records 18. Accordingly, an attribute 19 (e.g., telephone number 19c) or set of attributes 19 (e.g., set of telephone numbers 19c) of one record 18 may be compared to a corresponding attribute 19 or set of attributes 19 of another record 18 to identify those that correspond to the same individual, household, or the like. Such records 10 may then be linked, enabling greater benefit to be obtained thereby.

For example, records 18 corresponding to customer profiles may be generated by different sources. Certain records 18 may correspond to online purchases. Other records 18 may correspond to membership in a warehouse club. Still other records 18 may correspond to purchases in a brick-and-mortar retail store. Selected customers and/or households may correspond to records 18 from one or more such sources. However, there may not be any hard link (e.g., unifying or universal identification number) linking such records 18 together. Accordingly, a decision tree 10 may be used to identify those records 18 that correspond to the same individual, household, or the like. Once linked together, those records 18 may provide a more complete picture of the individual or household and, as a result, be more useful.

Figure 3:
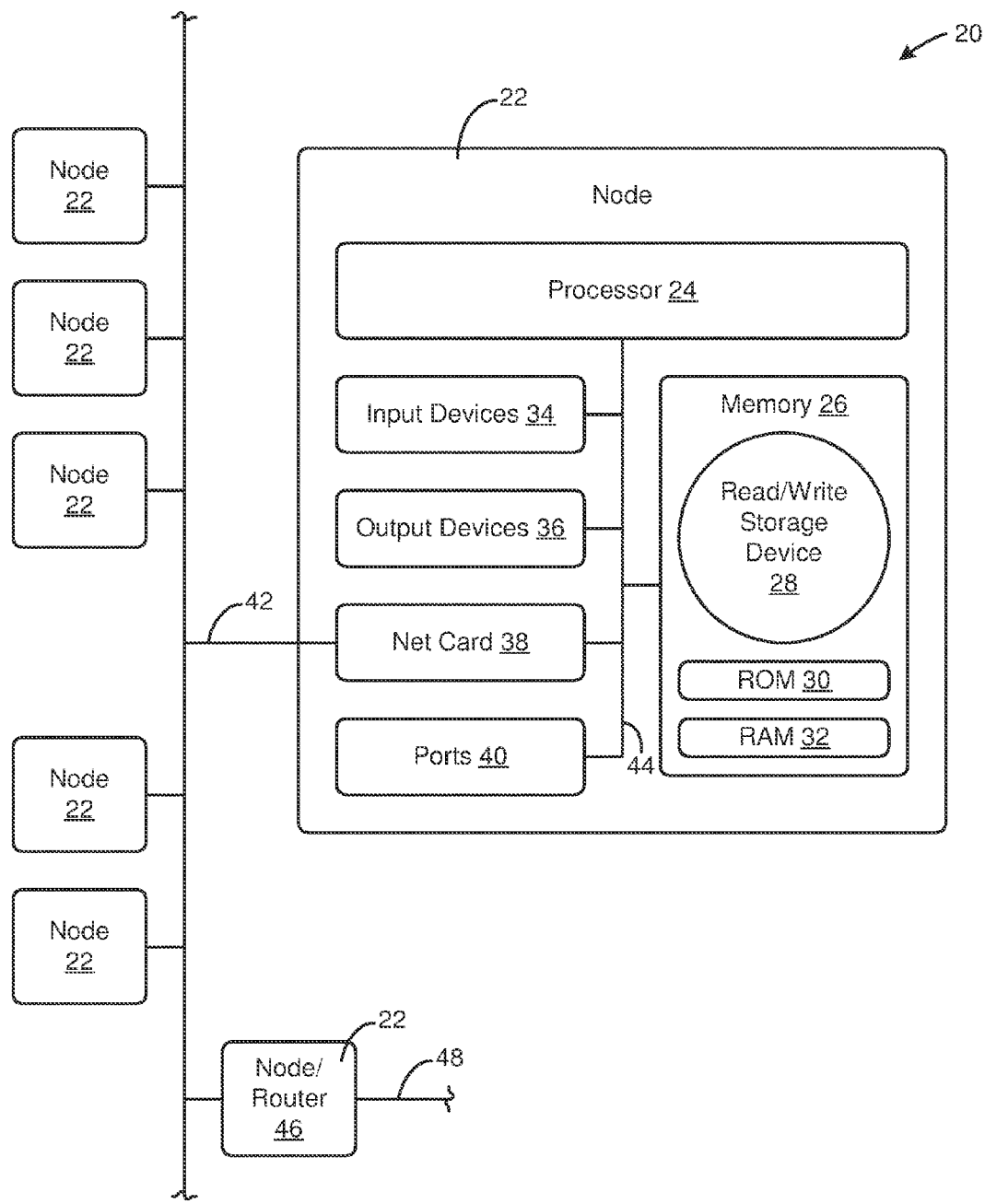
FIG. 3 is a schematic block diagram of one embodiment of a computer system in accordance with the present invention.

Referring to FIG. 3, in selected embodiments, linking two or more records 18 together may require comparing pairs of records 18. As the number records 18 increases, the number of comparisons grows exponentially. Moreover, each comparison of two records 18 may be computationally expensive. Accordingly, computer systems 20 in accordance with the present invention may employ new methodologies in order to efficiently process one or more large collections 14 of records 18 (e.g., collections 14 of over one million records 18, five hundred million records 18, one billion records 18, or the like).

Since comparisons between records 18 are independent (e.g., can be conducted without inter-process communication), record linkage may be performed in a parallel computing environment. Accordingly, in selected embodiments, a computer system 20 in accordance with the present invention may provide, enable, or support parallel computing. In certain embodiments, a system 20 may be embodied as hardware, software, or some combination thereof. For example, a system 20 may include one or more computing nodes 22.

A computing node 22 may include one or more processors 24, processor cores 24, or central processing units (CPUs) 24 (hereinafter "processors 24"). Each such processor 24 may be viewed an independent computing resource capable of performing a processing workload distributed thereto. Alternatively, the one or more processors 24 of a computing node 22 may collectively form a single computing resource. Accordingly, individual workload shares may be distributed to computing nodes 22, to multiple processors 24 of computing nodes 22, or combinations thereof.

In selected embodiments, a computing node 22 may include memory 26. Such memory 26 may be operably connected to a processor 24 and include one or more devices such as a hard drive 28 or other non-volatile storage device 28, read-only memory (ROM) 30, random access memory (RAM) 32, or the like or a combination or sub-combination thereof. In selected embodiments, such components 24, 26, 28, 30, 32 may exist in a single computing node 22. Alternatively, such components 24, 26, 28, 30, 32 may be distributed across multiple computing nodes 22.

In selected embodiments, a computing node 22 may include one or more input devices 34 such as a keyboard, mouse, touch screen, scanner, memory device, communication line, and the like. A computing node 22 may also include one or more output devices 36 such as a monitor, output screen, printer, memory device, and the like. A computing node 22 may include a network card 38, port 40, or the like to facilitate communication through a computer network 42. Internally, one or more busses 44 may operably interconnect various components 24, 26, 34, 36, 38, 40 of a computing node 22 to provide communication therebetween. In certain embodiments, various computing nodes 22 of a system 20 may contain more or less of the components 24, 26, 34, 36, 38, 40, 44 described hereinabove.

Different computing nodes 22 within a system 20 may perform different functions. For example, one or more computing nodes 22 within a system 20 may function as or be master computing nodes 22. Additionally, one or more computing nodes 22 within a system 20 may function as or be worker computing nodes 22. Accordingly, a system 20 may include one or more master computing nodes 22 distributing work to one or more worker computing nodes 22. In selected embodiments, a system 20 may also include one or more computing nodes 22 that function as or are routers 46 and the like. Accordingly, one computer network 42 may be connected to other computer networks 48 via one or more routers 46.

Figure 4:
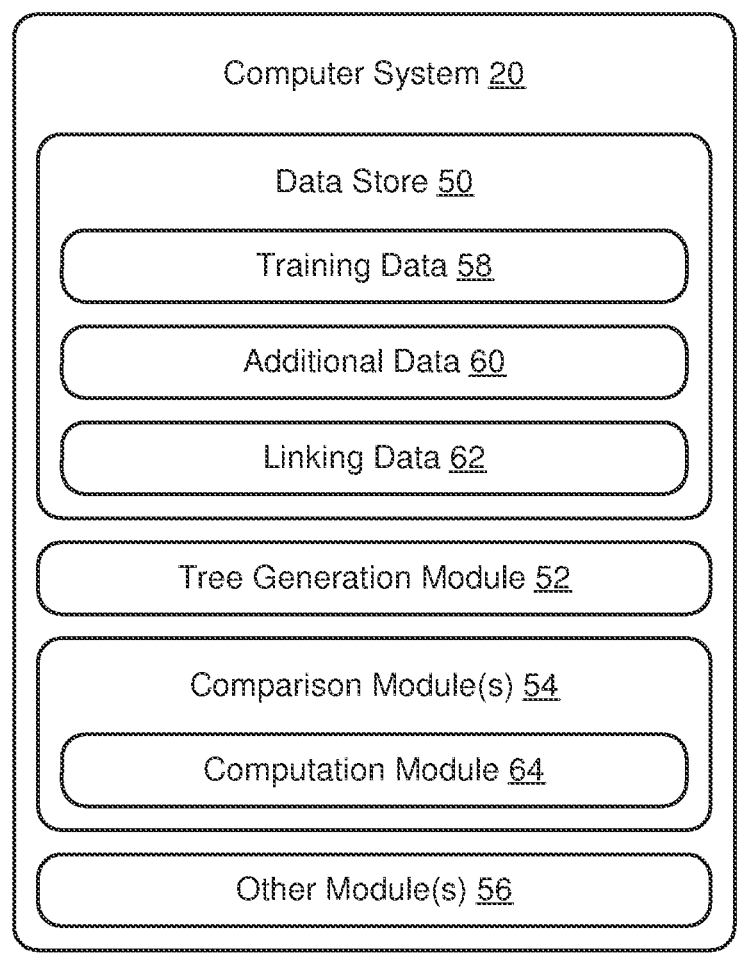
FIG. 4 is a schematic block diagram of various functional modules that may be included within a computer system in accordance with the present invention.

Referring to FIG. 4, a system 20 in accordance with the present invention may process records 18 in any suitable manner. In selected embodiments, the nature of the hardware and/or software of a system 20 may reflect the specific processing to be performed. For example, a system 20 configured to link records 18 may include one or more modules providing, enabling, or supporting such functionality.

A computer system 20 in accordance with the present invention may include any suitable arrangement of modules. In certain embodiments, a computer system 20 may include a data store 50, tree-generation module 52, comparison module 54, one or more other modules 56 as desired or necessary, or the like or a combination or sub-combination thereof.

In selected embodiments, certain components or modules of a computer system 20 may be associated more with computing nodes 22 of a certain type. For example, a data store 50 may be primarily or exclusively associated with one or more master computing nodes 22. Conversely, a comparison module 54 may be primarily or exclusively associated with one or more worker computing nodes 22.

A data store 50 may contain information supporting the operation of a computing system 20. In selected embodiments, a data store 50 may contain or store one or more records 18. For example, a data store 50 may contain one or more records 18 comprising training data 58 (e.g., records 18 used by a tree-generation module 52 in building one or more decision trees 10), one or more records 18 comprising additional data 60 (e.g., records 18 to be processed for record linkage), or the like or combinations thereof. A data store 50 may also contain data, information, results, or the like produced by a computer system 20 or one or more components or modules thereof. For example, a data store 50 may contain linking data 62 identifying which records 18 correspond to the same individual, household, or the like.

A tree-generation module 52 may generate and/or train one or more of the decision trees 10 used by a comparison module 54 to process (e.g., link) records 18. A comparison module 54 may correspond to, enable, or support the processing of one or more records 18 in any suitable manner. In selected embodiments, a comparison module 54 may enable one or more worker computing nodes 22 to compare the records 18 of a particular group amongst themselves using one or more decision trees 10 (e.g., a random forest of probability estimation trees 10) to identify records 18 that correspond to the same individual, household, or the like.

A computer system 20 may correspond to or include multiple comparison modules 54. For example, in a parallel computing environment, a plurality of worker computing nodes 22 may each correspond to, enable, or support a comparison module 54. Accordingly, the number of comparison modules 54 may correspond to or match the number of worker computing nodes 22.

In selected embodiments, a comparison module 54 may include a computation module 64. A computation module 64 may be programmed to perform one or more computations required by the distinctions of one or more distinction nodes 12. That is, a decision tree 10 may include one or more distinction nodes 12 corresponding to distinctions requiring completion of selected computations. Due to the fact that the computations may be, in the overall context and/or scale of the process, computationally expensive, they may initially be left uncomputed. Accordingly, if a distinction node 12 requiring such computation is never reached as subject data (e.g., a pair of records 18 being compared) is processed through a corresponding decision tree 10, no computation time gets wasted. However, if and when the distinction node 12 is reached, a computation module 64 may complete the computation "just-in-time" or "on-demand." Thereafter, a distinction based on results of the computation may be made.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on one or more master computing nodes 22, worker computing nodes 22, or combinations thereof. In selected embodiments, one or more master and/or worker computing nodes 22 may be positioned remotely with respect to one another. Accordingly, such computing nodes 22 may be connected to one another through any type of network, including a local area network (LAN) or a wide area network (WAN), or the connection may be made through the Internet using an Internet Service Provider.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Selected embodiments in accordance with the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 5:
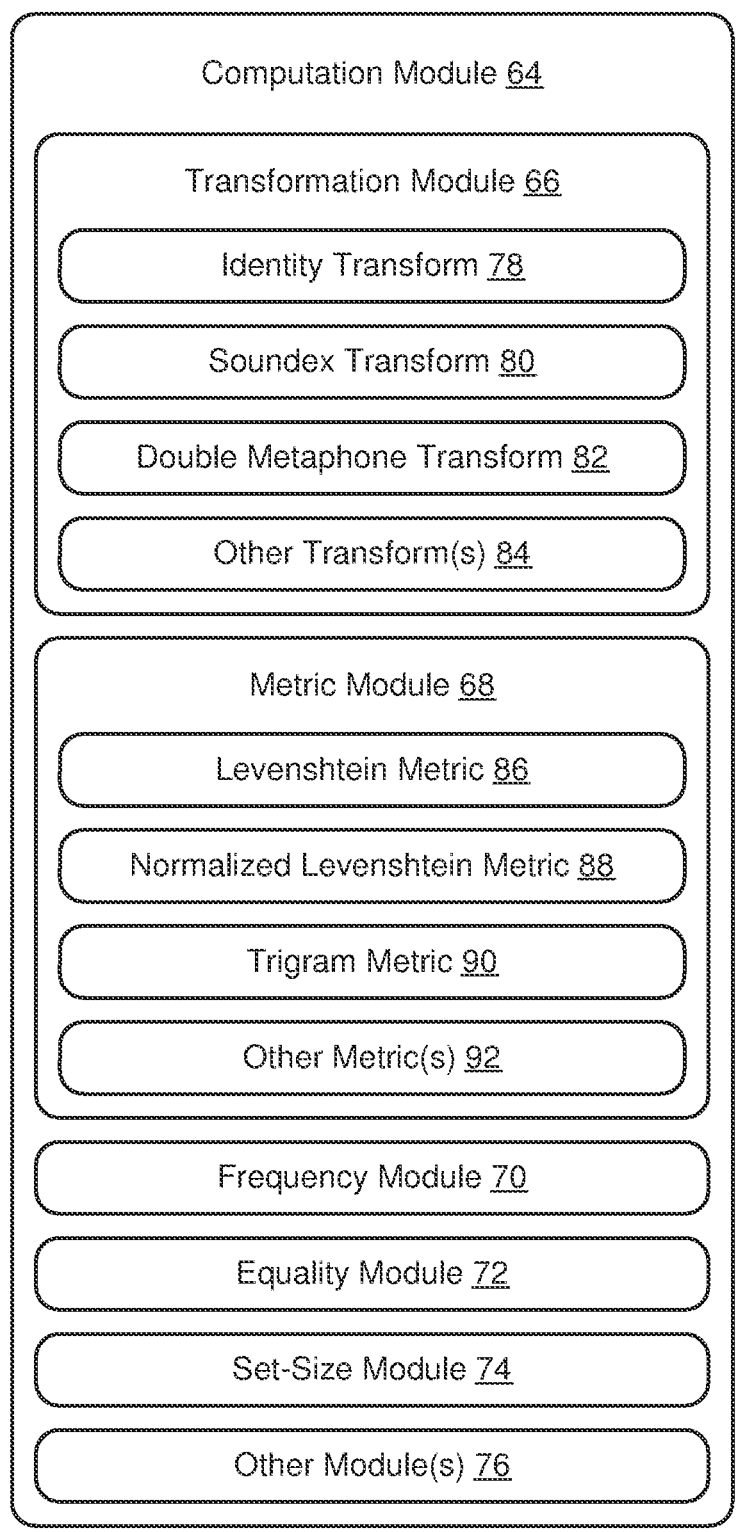
FIG. 5 is a schematic block diagram of one embodiment of a computation module in accordance with the present invention.

Referring to FIG. 5, in selected embodiments, one or more computations corresponding to or performed by a computation module 64 may be distinguishable from distinctions made at distinction nodes 12. In general, computations performed by a computation module 64 may be more computationally intensive than distinctions. Alternatively, or in addition thereof, computations performed by a computation module 64 may be prerequisites for distinctions. That is, the distinctions of the corresponding distinction nodes 12 cannot be meaningfully attempted until one or more corresponding computations of the computation module 64 are complete.

For example, a distinction of a distinction node 12 may question whether the normalized Levenshtein distance for two compared character strings is less than 0.02. Thus, the distinction may be a simple comparison to see whether the particular normalized Levenshtein distance is less than 0.02. However, such a distinction cannot be meaningfully attempted or made until the normalized Levenshtein distance for the two compared character strings has been computed. Such prerequisite computation may be the domain of a computation module 64 in accordance with the present invention.

A computation module 64 in accordance with the present invention may include any suitable arrangement of sub-components or modules. The nature of such sub-components or modules may depend on the nature of the distinctions of one or more corresponding decision trees 10. In certain embodiments, a computation module 64 may include a transformation module 66, metric module 68, frequency module 70, equality module 72, set-size module 74, one or more other modules 76 performing other prerequisite computations as desired or necessary, or the like or a combination or sub-combination thereof.

A transform module 66 may support, enable, or provide the computation associated with transformations of attributes 19. For example, a transform module 66 may enable a transformation of a particular character string into a phonetic representation thereof. Accordingly, a transformation module 66 may support or enable distinctions and distinction nodes 12 based on phonetic representations or the like. In certain embodiments, a transform module 66 may include, support, or enable an identify transform 78, Soundex transform 80, Double Metaphone transform 82, one or more other transforms 84 as desired or necessary, or the like or a combination or sub-combination thereof.

A metric module 68 may support, enable, or provide the computation associated with one or more metrics. For example, a metric module 68 may enable a computation of one or more metrics that numerically characterize the similarity or dissimilarity between two compared character strings. Accordingly, a metric module 68 may support or enable distinctions and distinction nodes 12 based on string similarity. In certain embodiments, a metric module 68 may include, support, or enable a Levenshtein metric 86 for calculating a Levenshtein distance, a normalized Levenshtein metric 88 for calculating a normalized Levenshtein distance, a trigram metric 90 based on the presence or absence of selected trigrams (e.g., a trigram ratio corresponding to the number of trigrams found in both compared character strings, divided by the number of trigrams found in either compared character string), one or more other metrics 92 as desired or necessary, or the like or a combination or sub-combination thereof.

A frequency module 70 may support, enable, or provide the computation associated with one or more occurrence patterns or frequencies. For example, a frequency module 70 may enable a computation of a value characterizing how common a particular name is in a given population or set. Accordingly, a frequency module 70 may support or enable distinctions and distinction nodes 12 based on occurrence patterns or frequencies.

An equality module 72 may support, enable, or provide the computation associated with a determination of whether two compared attributes 19 are equal, interchangeable, match, or the like. For example, an equality module 72 may enable a "just-in-time" determination of whether one character string identifying a state of residence (or synonyms, abbreviations, or the like thereof) matches another character string identifying a state of residence. Accordingly, an equality module 72 may support or enable distinctions and distinction nodes 12 based on whether one character string is equal to another character string.

A set-size module 74 may support, enable, or provide the computation associated with determining the size of one or more sets of attributes 19. For example, a set-size module 74 may enable a computation of the quantity of telephone numbers 19c corresponding to a particular record 18. Accordingly, a set-size module 74 may support or enable distinctions and distinction nodes 12 based on the size of one or more sets of attributes 19.

Figure 6:
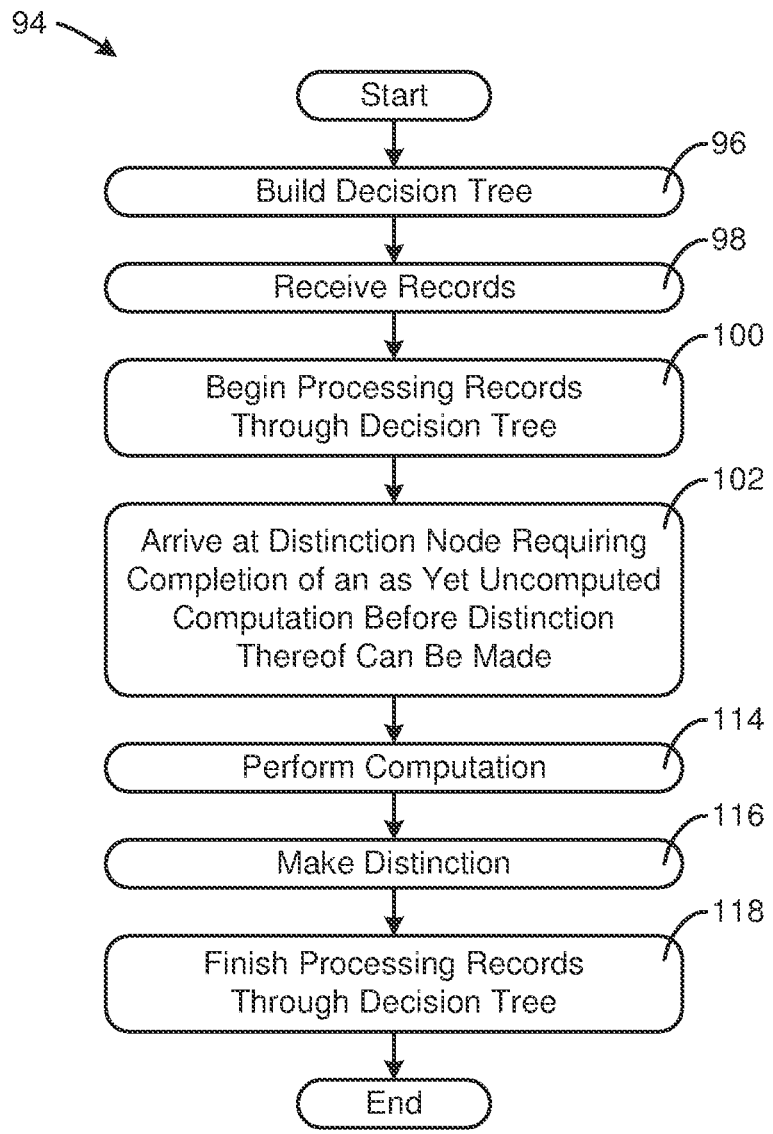
FIG. 6 is a schematic block diagram of one embodiment of a method for just-in-time nodal computation in accordance with the present invention.

Referring to FIG. 6, in selected embodiments, a method 94 for processing of a collection of computerized records 18 may begin with building 96 one or more decision trees 10 and receipt 98 of a collection of records 18 (or access thereto) by a system 20 in accordance with the present invention. Sometime subsequent thereto, the collection of records 18 may be divided into groups and distributed among a plurality of worker computing nodes 22, where processing the records through a decision tree 10 may begin 100. Accordingly, the number of groups may correspond to the number of worker computing nodes 22 that are to process the records 18.

At some point during the processing of the records 18, subject data (e.g., a pair of records 18 being compared to one another) may arrive 102 at a distinction node 12. The distinction node 12 may correspond to a particular computation. As yet, that computation may be uncomputed. However, the computation may be a prerequisite for the distinction corresponding to the distinction node 12. Accordingly, after the arrival 102 of the subject data at the distinction node 12, the computation may be performed 114 (e.g., by a computation module 64).

The exact nature of the computation may depend on the nature of the distinction of the distinction node 12. In selected embodiments, the computation may include one or more transformations, metric calculations, frequency calculations, equality calculations, set-size calculations, or the like or combinations or sub-combinations thereof.

The computation may be uncomputed at the time of arrival at the distinction node 12 because, in selected embodiments or situations, the computation may not be needed. That is, as subject data passes through a decision tree 10, it will not reach every distinction node 12. Any time spent on computations corresponding to missed distinction nodes 12 will be wasted. Accordingly, a computer system 20 (e.g., a computation module 64) may improve efficiency by performing 114 computations just-in-time or on demand as necessary.

Once the computation has been completed, the distinction of the corresponding distinction node 12 may be made 116. The processing of the records 18 through the decision tree 10 may then continue until it is finished 118 or completed 118. In selected embodiments, continuing through the decision tree 10 may include arriving at another distinction node 12 requiring completion of an as yet uncomputed computation. Accordingly, selected steps 102, 114, 116 of a method 94 in accordance with the present invention may be repeated.

The flowchart in FIG. 6 illustrates the architecture, functionality, and operation of possible implementations of systems, methods, and computer program products according to certain embodiments of the present invention. In this regard, each block in the flowchart may represent a module, segment, or portion of code, which comprises one or more executable instructions for implementing the specified logical function(s). It will also be noted that each block of the flowchart illustration, and combinations of blocks in the flowchart illustration, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A computer-implemented method for efficiently processing a large number of records, the method comprising:
   estimating, by a computer system, a probability that subject data is in a single class by:
      obtaining, by the computer system, a plurality of records, the plurality of records comprising the subject data;
      obtaining, by the computer system, two or more probability estimation trees, each of the two or more probability estimation trees comprising multiple paths;
      processing, by the computer system, the plurality of records through at least two of the two or more probability estimation trees the processing in each of the at least two of the two or more probability estimation trees comprising:
         arriving of the subject data, at a distinction node of the each of the at least two of the two or more probability estimation trees, the distinction node corresponding to a distinction requiring completion of an as yet uncomputed computation;
         completing, by the computer system after the arriving of the subject data at the distinction node of the each of the at least two of the two or more probability estimation trees, the computation;
         making the distinction based on results of the computation;
         selecting a path of the multiple paths based at least in part on the distinction;
         directing the subject data to another distinction node of the each of the at least two of the two or more probability estimation trees; and
         estimating a class for the subject data based at least in part on the path of the multiple paths selected; and
      combining, by the computer system, the class that is estimated of the at least two of the two or more probability estimation trees into the single class.

2. The method of claim 1, wherein at least one of the two or more probability estimation trees is programmed to perform record linkage.

3. The method of claim 2, wherein each record of the plurality of records comprises a customer profile.

4. The method of claim 3, wherein the at least one of the two or more probability estimation trees is programmed to identify records within the plurality of records that are likely to correspond to a common customer or household.

5. The method of claim 4, wherein the distinction corresponds to a metric characterizing a similarity between attributes of compared records of the plurality of records.

6. The method of claim 5, wherein the computation comprises calculation of the metric.

7. The method of claim 6, wherein the metric is selected from the group consisting of:
   a Levenshtein distance;
   a normalized Levenshtein distance;
   a trigram score; and
   a trigram ratio.

8. The method of claim 1, wherein the computer system provides a parallel computing environment.

9. The method of claim 8, wherein the computer system comprises a plurality of worker nodes.

10. The method of claim 9, wherein the processing is conducted by the plurality of worker nodes.

11. The method of claim 1, wherein the distinction corresponds to a metric characterizing a similarity between attributes of compared records of the plurality of records.

12. The method of claim 11, wherein the computation comprises calculation of the metric.

13. The method of claim 12, wherein the metric is selected from the group consisting of:
   a Levenshtein distance;
   a normalized Levenshtein distance;
   a trigram score; and
   a trigram ratio.

14. The method of claim 1, wherein:
   each record of the plurality of records comprises a customer profile; and
   the plurality of records comprises at least five hundred million records.

15. The method of claim 1, wherein:
at least one of the two or more probability estimation trees is programmed to perform record linkage;
each record of the plurality of records comprises a customer profile;
the at least one of the two or more probability estimation trees is programmed to identify records within the plurality of records that are likely to correspond to a common customer or household;
the distinction corresponds to a metric characterizing a similarity between attributes of compared records of the plurality of records;
the computation comprises calculation of the metric;
the metric is selected from the group consisting of:
a Levenshtein distance;
a normalized Levenshtein distance;
a trigram score; and
a trigram ratio;
the computer system provides a parallel computing environment;
the computer system comprises a plurality of worker nodes; and
the processing is conducted by the plurality of worker nodes.

16. A computer-implemented method for efficiently processing a large number of records, the method comprising:
estimating, by a computer system, a probability that subject data is in a single class by:
obtaining, by the computer system, a plurality of records, the plurality of records comprising subject data and each record of the plurality of records comprises a customer profile;
obtaining, by the computer system, two or more probability estimation trees, each of the two or more probability estimation trees comprising multiple paths and at least one of the two or more probability estimation trees is programmed to identify records within the plurality of records that are likely to correspond to a common customer or household; and
processing, by the computer system, the plurality of records through at least two of the two or more probability estimation trees, the processing in each of the at least two of the two or more probability estimation trees comprising:
arriving of the subject data at a distinction node of the each of the at least two of the two or more probability estimation trees, the distinction node corresponding to a metric characterizing a similarity between character strings of compared records of the plurality of records;
calculating, by the computer system after the arriving of the subject data at the distinction node of the each of the at least two of the two or more probability estimation trees, a value corresponding to the metric;
making a distinction based on the value;
selecting a path of the multiple paths based at least in part on the distinction;
directing the subject data to another distinction node of the each of the at least two of the two or more probability estimation trees; and
estimating a class for the subject data based at least in part on the path of the multiple paths selected; and
combining, by the computer system, the class that is estimated of the at least two of the two or more probability estimation trees into the single class.

17. The method of claim 16, wherein the metric is selected from the group consisting of:
a Levenshtein distance;
a normalized Levenshtein distance;
a trigram score; and
a trigram ratio.

18. The method of claim 16, wherein the computer system provides a parallel computing environment.

19. The method of claim 18, wherein the computer system comprises a plurality of worker nodes.

20. The method of claim 19, wherein the processing is conducted by the plurality of worker nodes.

21. The method of claim 16, wherein:
the metric is selected from the group consisting of:
a Levenshtein distance;
a normalized Levenshtein distance;
a trigram score; and
a trigram ratio;
the computing system provides a parallel computing environment;
the computer system comprises a plurality of worker nodes; and
the processing is conducted by the plurality of worker nodes.

22. A computer system comprising:
one or more processing modules; and
one or more non-transitory storage modules storing computing instructions configured to run on the one or more processing modules and perform the acts of:
estimating, by a computer system, a probability that subject data is in a single class by:
obtaining, by the computer system, a plurality of records, the plurality of records comprising the subject data;
obtaining, by the computer system, two or more probability estimation trees, each of the two or more probability estimation trees comprising multiple paths;
processing, by the computer system, the plurality of records through at least two of the two or more probability estimation trees, the processing in each of the at least two of the two or more probability estimation trees comprising:
arriving of the subject data, at a distinction node of the each of the at least two of the two or more probability estimation trees, the distinction node corresponding to a distinction requiring completion of an as yet uncomputed computation;
completing, by the computer system after the arriving of the subject data at the distinction node of the each of the at least two of the two or more probability estimation trees, the computation;
making the distinction based on results of the computation;
selecting a path of the multiple paths based at least in part on the distinction;
directing the subject data to another distinction node of the each of the at least two of the two or more probability estimation trees; and
estimating a class for the subject data based at least in part on the path of the multiple paths selected; and
combining, by the computer system, the class that is estimated of the at least two of the two or more probability estimation trees into the single class.

23. The system of claim 22, wherein:
at least one of the two or more probability estimation trees is programmed to perform record linkage;
each record of the plurality of records comprises a customer profile;
the at least one of the two or more probability estimation trees is programmed to identify records within the plurality of records that are likely to correspond to a common customer or household;
the distinction corresponds to a metric characterizing a similarity between attributes of compared records of the plurality of records;
the computation comprises calculation of the metric;
the computer system provides a parallel computing environment;
the computer system comprises a plurality of worker nodes; and
the processing is conducted by the plurality of worker nodes.

* * * * *